United States Patent Office 3,046,247
Patented July 24, 1962

3,046,247
NEW ESTER PLASTICIZER COMPOSITION COMPRISING A VINYL CHLORIDE RESIN AND AN ESTER PLASTICIZER
Howard L. Wilson, Arcola, Ill., and Fred W. Banes and Joseph F. Nelson, Westfield, N.J., assignors to Esso Research and Engineering Company, a corporation of Delaware
No Drawing. Filed Apr. 9, 1959, Ser. No. 805,151
4 Claims. (Cl. 260—31.8)

This invention relates to a new class of materials which have been discovered to be particularly effective as plasticizers for resins and rubber-like materials.

The use of polycarboxylic acid esters of primary alcohols as plasticizers for high molecular weight materials has steadily increased with the increase in demand for plastic materials derived from synthetic resins such as vinyl resins, phenol-aldehyde resins, urea-formaldehyde resins, and acrylate and methacrylate resins. Such plasticizers are also employed with cellulose derivatives such as cellulose nitrate, cellulose acetate, cellulose propionate, cellulose butyrate, cellulose acetobutyrate, and cellulose nitroacetate. A further use for such plasticizers is their employment with rubbers such as the emulsion copolymers of butadiene with styrene or acrylonitrile, or the copolymers of isobutylene with small amounts of a diolefin such as isoprene.

In particular, this invention relates to the use of certain ester mixtures derived from certain alcohols and polycarboxylic acids.

More particularly, this invention relates to the use of such plasticizers with vinyl chloride homopolymers and the copolymers of vinyl chloride and vinyl acetate wherein a major proportion of the copolymer is derived from vinyl chloride.

It has now been discovered that certain ester mixtures are unexpectedly superior to the pure ester components and to other ester mixtures particularly with reference to the dynamic modulus of the plasticized resin.

"Dynamic modulus" is a test of the viscoelastic properties of a flexible or rubber-like material. The behavior of a material undergoing periodic deformation can be described in terms of two physical properties, the dynamic modulus and the coefficient of internal viscosity. Both of these depend upon temperature, frequency and the molecular weight of the material tested. The test has been used by industry to obtain comparative data on plasticizers by providing quantitative measures of low temperature stiffening in the plasticized material. A low dynamic modulus indicates a composition of high flexibility. The values obtained in testing for the dynamic modulus of a material are customarily expressed in p.s.i. These values may be defined as the force required to cause a rubber-like material to undergo a predetermined unit deformation under cyclic conditions. A detailed description of the test and its many uses may be found in the following publications:

(1) "A Mechanical Oscillograph for Routine Tests of Rubber-Like Material," Felix L. Yerzley, Rubber Chemistry and Technology, volume 13, page 149 (1940).
(2) "The Methods of Specifying the Properties of Viscoelastic Materials," Turner Alfrey and Paul Doty, Journal of Applied Physics, volume 16, page 700 (1945).
(3) "Determination of the Dynamic Properties of Rubber-Like Materials by Means of Modified Yerzley Oscillograph," F. P. Baldwin, The Rubber Age, April 1950.

In the field of plasticizers for commercially produced polymers such as polyvinylchloride or copolymers containing vinyl chloride as the major constituent, mainly three alcohols, octanol-1, 2-ethylhexanol-1 and isooctyl alcohol, are phthalated to produce esters for blending into the polyvinylchloride. These esters impart flexibility to the polymer to permit is use in a wide variety of applications where self-supporting flexible films are desirable, such as shower curtains, produce wrapping, packaging, etc. However, these alcohols are either limited in supply, or the plasticizing efficiency of these compounds is inferior for certain applications.

The alcohol mixtures required for the present invention are best obtained by the "Oxo" process. The term "Oxo" process is understood in the art as referring to a process wherein an olefin feed is first reacted or "oxonated" with carbon monoxide and hydrogen at a temperature between 250° and 400° F. and under a pressure of about 150 to 400 atmospheres in the presence of a cobalt catalyst to form aldehydes in accordance with the following reaction:

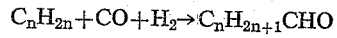
$$C_nH_{2n}+CO+H_2 \rightarrow C_nH_{2n+1}CHO$$

and the aldehydes are then catalytically hydrogenated to form the desired alcohols as follows:

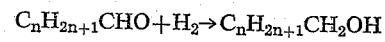
$$C_nH_{2n+1}CHO+H_2 \rightarrow C_nH_{2n+1}CH_2OH$$

The preferred hydrogenation catalyst is nickel though other known hydrogenation catalysts such as the sulfides of nickel, molybdenum and cobalt, with or without support on carbon, silica, etc., can also be used, especially where a rugged catalyst is desired. The basic principles and operating conditions of the "Oxo" process which can be used for making the desired alcohols are described, for example in U.S. Patents 2,327,066; 2,595,096 and elsewhere.

Particularly effective plasticizers can be prepared according to this invention from certain mixtures of esters obtained by esterifying certain $C_8$ to $C_{10}$ alcohols with a polycarboxylic acid of 4 to 10 carbon atoms.

The alcohols may be obtained by oxonation of an olefin stream obtained by fractionation and/or extraction of the products from the thermal, usualy steam, cracking of a petroleum distillate boiling in the range between about 450° and 1100° F. or higher which contains a high, preferably a major, proportion of paraffin wax or petrolatum and $C_{12}$ and higher paraffins which are a liquid at 20° to 25° C., e.g. a fraction containing $C_7$ to $C_8$, $C_7$ to $C_9$, or $C_8$ to $C_9$ olefins.

The highly superior plasticizers can be prepared by esterifying a mixture of such alcohols which contains at least 35 wt. percent of such $C_8$ alcohols, at least 30 wt. percent of such $C_9$ alcohols, and wherein the balance, if any, is made up essentially of such $C_{10}$ alcohols. The inclusion of lower molecular weight alcohols in such a mixture has been found to adversely affect the dynamic modulus of the plasticized resin. Translated into actual use this means the materials produced using such a plasticizer will be less flexible at low temperatures than if such lower alcohols had not been included in the mixture. Whenever practicable, the $C_7$ and lower molecular weight alcohols should be completely excluded from the mixture to be esterified. Where it is inconvenient or impossible to effect a complete separation of $C_7$ and lower alcohols the content of such alcohols in the mixture should be maintained below about 3 wt. percent. The higher molecular weight alcohols, e.g. $C_{11}$ and $C_{12}$ alcohols, are not preferred for use in this invention and the content of such alcohols in such mixture should be maintained below about 5 wt. percent. If such combinations are adhered to, plasticized polyvinyl chloride compositions, such as those hereinafter described, can be consistently prepared having a dynamic modulus at —20° C. of below 18 where the ratio of ester to polymer is about 1:2. The most preferred mixture of alcohols for this esterification is made up exclusively of a mixture of such $C_8$ and $C_9$ alcohols wherein such $C_8$ alcohols are the major component and such $C_9$ alcohols comprise at least 30 wt. percent of the mixture. Another outstanding esterification mixture is made up exclusively of such $C_8$, $C_9$ and $C_{10}$ alcohols wherein the $C_8$ alcohols are the major component and such $C_9$ alcohols comprise at least 30 wt. percent of the mixture. The most preferred blend of esters is made up of separately esterified $C_8$ and $C_9$ alcohols wherein the esters derived from $C_8$ alcohols are the major component.

It has further been discovered that if alcohols of each molecular weight are separately esterified and the resulting esters mixed an improvement will unexpectedly result in the dynamic modulus of the plasticized resin, i.e. a lowering thereof, in comparison to the same resin plasticized with esters derived from the same alcohols and the same acids and mixed in the same proportions where the alcohols are mixed prior to esterification.

Useful polyalkyl-ester mixtures of the present invention prepared from the aforementioned "Oxo" alcohols include ortho, meta, and para-phthalates, adipates, azelates, sebacates, succinates, and diglycolates or mixtures thereof. These esters can be prepared by any of the conventional methods, as by reacting the alcohol with acid, or with acid anhydride, or with acid chloride, or by first transforming the alcohol into an alkyl halide and then reacting the latter with a metal salt of the selected acid. Ester interchange may also be used. For example, phthalate esters may be prepared efficiently be reacting about 2 moles of a suitable alcohol with one mole of phthalic anyhydride, without any catalyst or in the presence of sulfuric or preferably toluene sulfonic acid catalyst and using a solvent such as benzene, toluene or xylenes as entrainers. The invention does not rest in the process of making the new esters, but rather in the esters themselves and the ways in which they are combined as plasticizers which, due to the particular choice of alcohols used in their preparation, possess a superior and unexpected combination of properties. As described above, where particularly pure and colorless esters having good plasticizing action at low temperatures are desired, it is important first to subject the crude "Oxo" alcohol to a distillation at pot temperatures preferably not exceeding about 240° C. and preferably with previous caustic treatment, to remove minor impurities such as aldehydes, acids, esters, acetals, unsaturated carbonyl compounds, etc.

The effectiveness of the novel ester mixtures of this invention as plasticizers is shown in the following examples wherein a commercial polyvinyl chloride resin known as Geon 101 was chosen as the illustrative material. In preparing the test samples, 100 grams of the resin were dry-blended by hand with 3 grams of basic lead carbonate and 1.5 grams of stearic acid. Instead of the lead carbonate, 1 to 5 parts per 100 parts of resin of other basically reactive stabilizers should be used. The dry mixture was heated in a beaker with 50 grams of plasticizers and stirred to give a homogeneous blend whereupon the latter was charged to a 6 x 12 inch laboratory mill heated with steam to about 280 to 320° F. The resin was then fluxed about two minutes and allowed to mill with a rolling bank for five minutes with occasional cutting. Qualitative tests indicated that different combinations of vinyl resins and plasticizer required somewhat different mill temperatures to obtain a good mix in five minutes. After mill mixing, the stock was sheeted off at 0.075 to 0.15 inch thickness.

In general, it was observed that the novel esters flux or solvate high molecular weight vinyl resins at the usual milling temperatures noticeably faster than similar esters previously known. This is a very important factor since it has long been recognized that prolonged exposure of a vinyl resin stock to heat during processing or later has a permanent adverse effect on the stability and physical properties of such a stock. The improved fluxing properties of the novel plasticizers thus have a direct beneficial effect on the properties of the plasticized resin in that these plasticizers make it possible to reduce the total high temperature history of the resin stock.

The sheeted stock was then molded at 280° F. in a standard A.S.T.M. mold (D16–41) yielding slabs 6 x 6 x 0.075 inch. The molding cycle was 10 minutes at minimum ram pressure to allow free flow of the resin, followed by 10 minutes at 900 lbs./sq. in. The molded slabs were allowed to stand near 75° F. for at least one day before testing.

Tensile properties were determined in the usual manner on a Scott tester (model L–3) at about 75° F. and 50% relative humidity, the rate of jaw separation being 20 inches per minute. The specimens tested were cut from molded slabs with die C (ASTM D412–41).

The dynamic modulus was determined by measuring the force developed in a plasticized vinyl film under conditions of 10% static deformation and 0.7% oscillatory deformation at 15 cycles per second. Values are expressed in p.s.i.

Example I

Two plasticized samples were prepared in accordance with the above-described procedure, using in each case 50 parts by weight of a commercial phthalate ester with 100 parts of polyvinylchloride. Commercial ester A was derived from a $C_8$ alcohol. Commercial ester B was derived from a different $C_8$ alcohol.

The physical properties of these samples, as tabulated below, were obtained on a modified Scott tester:

| Commercial Ester in Blend | A | B |
|---|---|---|
| Tensile, p.s.i. | 2,985 | 3,075 |
| Percent Elongation (at Break) | 275 | 275 |
| Modulus at 100% Elongation, p.s.i. | 2,130 | 2,080 |
| Dynamic Modulus X10⁻⁴: | | |
| 25° C | 1.0 | 1.2 |
| 10° C | 3.0 | 4.7 |
| −5° C | 11.0 | 11.5 |
| −20° C | 20.5 | 21.5 |

The two plasticized samples were examined by hand manipulation and a noticeable difference in flexibility was observed. The above data indicates therefore that a 5 to 25% reduction in dynamic modulus is sufficient to make a noticeable difference in flexibility rating. This difference is sufficient to affect the durability of the product.

Example II

A petrolatum containing petroleum fraction which boils in the range of about 700 to 1000° F. is subjected to thermal cracking first in the liquid phase under a pressure of 10 to 30 p.s.i.g. for about 6 to 7 seconds at an average temperature of about 900° F. Superheated steam (1100° F.) is injected into the liquid phase cracked product to vaporize the same. The liquid phase cracked product is further cracked in the vapor phase for a shorter period of time. The residence time in vapor phase cracking is about 2.3 seconds. The cracking is conducted in conventional steam cracking equipment. The temperature and hydrocarbon partial pressure at the cracking coil outlet are about 1100° F. and 6 p.s.i.a. respectively.

The cracking products and unreacted hydrocarbons are fractionally distilled and $C_7$ to $C_9$ straight chain and lightly branched alpha olefins are separated and recovered.

Example III $C_7$ essentially straight chain alpha olefins prepared as in Example II are converted to $C_8$ alcohols by reaction with carbon monoxide and hydrogen in a two stage "Oxo" process as hereinbefore described.

The conditions of reaction are:

FIRST STAGE—ALDEHYDE SYNTHESIS

| | |
|---|---|
| Catalyst | Cobalt oleate. |
| Wt. percent catalyst on feed | 1.2. |
| Temperature, °F., avg | 349. |
| Pressure, p.s.i.g | 3000. |
| Liquid feed rate, v./v./hr | 0.99. |
| $H_2$+CO feed rate, s.c.f./b.[1] | 3000. |
| $H_2$/CO ratio, volume | 1.14. |
| Olefin conversion, percent | 77. |

SECOND STAGE—HYDROGENATION OF ALDEHYDES TO ALCOHOLS

| | |
|---|---|
| Catalyst | Nickel and tungsten sulfides. |
| Catalyst temperature, °F., avg | 410. |
| Liquid feed rate, v./v./hr | 1.0. |
| Hydrogen pressure, p.s.i.g | 2700. |
| Hydrogen rate, c.f./b | 5000. |

Distillation summary:
  Weight percent hydrocarbon + unreacted (init. 340° F.) __ 24.
  Weight percent alcohols (340–370° F.) __ 61.
  Weight percent bottoms (370° F. up) __ 15.
  Alcohol selectivity, percent __ 74.

[1] Standard cubic feet per barrel.

In a similar reaction the same alcohols may be produced using a catalyst of molybdenum sulfide on charcoal.

*Example IV*

Esters were blended with polyvinyl chloride by the same procedure and in the same proportions as used for preparation of the samples of Example I. These esters were prepared by reacting alcohols with phthalic anhydride in the manner hereinbefore described. The alcohols were prepared by the "Oxo" process as described in U.S. Patents 2,327,066 and 2,595,096, under conditions essentially as set forth in Example III. The olefin feed to such "Oxo" process was prepared in accordance with U.S. Patent 2,736,685 and under conditions essentially as set forth in Example II by cracking a petroleum fraction of very high, >95%, wax content.

Ester #1 was prepared from $C_8$ alcohols derived from $C_7$ olefins as above described. Ester #2 was prepared in the same manner from $C_9$ alcohols derived from $C_8$ olefins. Ester blend #3 was obtained by blending 61 wt. percent of the same $C_8$ alcohol used to prepare ester #1 with 39 wt. percent of the same $C_9$ alcohol used to prepare ester #2 and then phthalating the mixed alcohol in the same manner as in the preparation of esters #1 and #2.

The physical properties of these samples were tested as in Example I and the results obtained are as follows:

| Ester or Ester Blend No. | 1 | 2 | 3 | |
|---|---|---|---|---|
| Ester Composition | Di-$C_8$-phthalate | Di-$C_9$-phthalate | 61% $C_8$ 39% $C_9$ | |
| | | | Actual | Expected[1] |
| Dynamic Modulus X10⁻⁴: | | | | |
| At 25° C | 1.07 | 1.1 | 1.1 | 1.08 |
| At 10° C | 3.60 | 3.5 | 2.9 | 3.56 |
| At −5° C | 10.7 | 10.6 | 8.4 | 10.65 |
| At −20° C | 20.6 | 18.6 | 15.4 | 19.81 |

[1] Calculated by taking 61% of the respective value from ester #1 and 39% of ester #2 and adding the two values.

It is to be noted that the dynamic modulus of ester blend #3 at a −20° C. is unexpectedly lower than either of the separate esters as well as lower than that expected from the additive properties of its ingredients.

*Example V*

An ester blend having the same ingredients as ester blend #3 of Example IV was prepared by blending 61 wt. percent of ester #1 with 39% of ester #2. In other words, the $C_8$ ester and the $C_9$ ester were separately phthalated and then mixed in contrast to phthalating the mixed alcohols as in #3.

The physical properties of this blend were tested as in Example IV and the results obtained are as follows:

| Ester Blend No. | 4 | |
|---|---|---|
| Composition of Blend | 61% Ester #1, 39% Ester #2 | |
| | Actual | Expected[1] |
| Dynamic Modulus X10⁻⁴: | | |
| At 25° C | 1.0 | 1.08 |
| At 10° C | 2.8 | 3.56 |
| At −5° C | 6.5 | 10.65 |
| At −20° C | 14.4 | 19.81 |

[1] Calculated by taking 61% of the respective value from ester #1 and 39% of ester #2 and adding the two values.

Thus a blend of esters 1 and 2 unexpectedly has a dynamic modulus lower than (a) either of its component esters, (b) the expected value from additive properties of its components, or (c) esters prepared from blending the same alcohols prior to esterification.

*Example VI*

This test was conducted on polyvinylchloride compositions prepared in the same manner as in the preceding examples except that esters derived from $C_8$, $C_9$ and $C_{10}$ alcohols were used. The olefins used as oxonation feeds were prepared by thermally cracking a petroleum fraction containing about 75% of waxy components.

| Ester or Ester Blend No. | 5 | 6 | 7 | 8 | |
|---|---|---|---|---|---|
| Ester Composition | Di-$C_9$ phthalate | Di-$C_{10}$ phthalate | Di-$C_8$ phthalate | 32.9% of #5, 32.1% of #6, 35% of #7 | |
| | | | | Actual | Expected |
| Dynamic Modulus X10⁻⁴: | | | | | |
| At 25° C | 1.5 | 2.04 | 1.17 | 1.21 | 1.55 |
| At 10° C | 4.08 | 4.64 | 3.56 | 3.63 | 4.11 |
| At −5° C | 10.18 | 10.89 | 10.48 | 9.52 | 10.51 |
| At −20° C | 18.76 | 17.26 | 18.36 | 17.10 | 18.12 |

Again it is to be noted that the blended sample #8 showed a substantial improvement in dynamic modulus over the expected values.

*Example VII*

A further test was conducted with polyvinylchloride compositions prepared as in the previous examples. In this test the phthalate esters used were derived from alcohols prepared by the Oxo process from olefins obtained by steam cracking a petroleum fraction containing about 63% of waxy material.

Esters derived from such $C_7$, $C_8$ and $C_9$ alcohols were tested individually and a blend of the three including 11.7 wt. percent of the ester derived from $C_7$ alcohol was also tested.

The advantage, i.e. decrease in dynamic modulus at low temperatures, gained by ester blending in the preceding examples was here materially reduced.

*Example VIII*

The retention of tensile and elongation on aging of esters 3, 4 and 8 of Examples IV, V and VI as compared with commercial esters A and B of Example I are shown in the following table:

| Ester No. | 3 | 4 | 8 | Com. Esters A | Com. Esters B |
|---|---|---|---|---|---|
| Aging 7 Days at 100° C: | | | | | |
| Percent Retention: | | | | | |
| Tensile | 90 | 88 | 89 | 87 | 67 |
| Elongation | 83 | 76 | 60 | 60 | 15 |
| Percent Volatile Loss | 7.0 | 6.6 | 9.1 | 22.4 | 27.6 |

These results indicate that the mixed esters are all equivalent or superior to the best commercial ester A with respect to retention of physical properties after aging. They also are definitely superior to the two commercial esters A and B in the percent volatile loss on aging. The use of these esters, therefore, is significant in the preparation of vinyl resin compounds which do not stiffen on aging.

*Example IX*

Tests are conducted as in Example IV and Example V except that the homopolymer of polyvinyl chloride is replaced with a commercial copolymer of vinyl chloride and 5 to 10 wt. percent of vinyl acetate. The same advantages gained by esterifying blended alcohols and blending esters of individual alcohols are attained as in Examples IV and V.

In summary, the novel invention relates to novel mixtures of alkyl esters of polybasic acids such as o-, m-, and p-phthalic, sebacic, diglycolic, adipic, succinic and azelaic, wherein the aliphatic alcohols used in the esterification reaction have from 8 to 10 carbon atoms per molecule and are derived by oxonation of $C_7$ to $C_9$ olefins.

In particular, the invention relates to plasticized resin compositions containing the novel esters as plasticizers, usually in proportions ranging from about 5 to 100 parts or preferably 30 to 60 parts per 100 parts of resin depending upon the use for the final product. Polymeric materials which lend themselves to successful plasticization with the esters of the invention include the various vinyl resins such as polyvinyl chloride, polyvinyl acetate, polyvinyl alcohol, copolymers of vinyl chloride with vinyl acetate, or vinylidine chloride, polyvinyl butyral or other polyvinyl acetals; nitrocellulose, ethyl cellulose; rubber-like polymers of diolefinic materials such as butadiene-nitrile (GR-A), butadiene-styrene (GR-S) or polychloroprene elastomers, or isobutylene-diolefin copolymers of the GR-I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber comprising 25 to 40% nitrile. It will be understood, of course, that in addition to the plasticizer, the polymer compositions may also contain conventional stabilizers such as basic lead carbonate, organic epoxides, sodium borate or the like, oleic acid, auxiliary plasticizers or softeners, fillers, pigments and eventually also curing agents, when the polymer is of the curable type.

It will be understood further that the foregoing examples have been given merely for purposes of illustration, but that other modifications of the present invention are possible without departing from the scope of the appended claims.

The term "oxonation" as used herein shall be understood to refer to the "Oxo" reaction as hereinbefore described in detail.

All percentages recited herein shall be construed as percentages by weight if not otherwise designated or described.

This application is a continuation-in-part of copending Serial No. 475,002, filed December 13, 1954, and now abandoned.

What is claimed is:

1. A composition of matter comprising 100 parts of a solid resin selected from the group consisting of polyvinyl chloride and vinyl chloride-vinyl acetate copolymers and about 5 to 100 parts of a mixture of neutral esters consisting essentially of the reaction product of phthalic acid and aliphatic alcohols selected from the group consisting of $C_8$, $C_9$ and $C_{10}$ alcohols obtained by hydrogenating the oxonation products of $C_7$ to $C_9$ alpha olefins obtained by thermally cracking a paraffin wax-containing petroleum fraction; wherein at least 35 wt. percent of the esters are formed from said $C_8$ alcohols, at least 30 wt. percent of the esters are formed from said $C_9$ alcohols and the balance of the esters are formed from said $C_{10}$ alcohols.

2. A composition of matter in accordance with claim 1 wherein said resin is polyvinyl chloride.

3. A composition of matter comprising 100 parts of a solid resin selected from the group consisting of polyvinyl chloride and vinyl chloride-vinyl acetate copolymers and about 5 to 100 parts of a mixture of neutral esters consisting essentially of the reaction product of phthalic acid and aliphatic alcohols selected from the group consisting of $C_8$, $C_9$ and $C_{10}$ alcohols obtained by hydrogenating the oxonation products of $C_7$ to $C_9$ alpha olefins obtained by thermally cracking a petroleum distillate, a major proportion of which is made up of $C_{12}$ and higher molecular weight paraffins; wherein at least 35 wt. percent of the esters are formed from said $C_8$ alcohols, at least 30 wt. percent of the esters are formed from said $C_9$ alcohols and the balance of the esters are formed from said $C_{10}$ alcohols.

4. A composition of matter comprising 100 parts by weight of solid polyvinyl chloride and about 5 to 100 parts by weight of a mixture of neutral esters consisting essentially of the reaction product of phthalic acid esterified with $C_8$ to $C_9$ aliphatic alcohols obtained by hydrogenating the oxonation products of $C_7$ to $C_8$ alpha olefins, wherein said olefins are obtained by steam cracking petrolatum and wherein at least 35 wt. percent of said esters are formed from said $C_8$ alcohols and at least 30 wt. percent of said esters are formed from said $C_9$ alcohols.

References Cited in the file of this patent

UNITED STATES PATENTS

| | | |
|---|---|---|
| 1,993,736 | Graves et al. | Mar. 12, 1935 |
| 2,015,077 | Lawson | Sept. 24, 1935 |
| 2,015,088 | Reid | Sept. 24, 1935 |
| 2,625,527 | Smith et al. | Jan. 13, 1953 |
| 2,730,513 | Balley et al. | Jan. 10, 1956 |
| 2,862,959 | Patrick et al. | Dec. 2, 1958 |
| 2,867,651 | Wise | Jan. 6, 1959 |